(12) United States Patent
Birsan et al.

(10) Patent No.: US 12,519,823 B2
(45) Date of Patent: Jan. 6, 2026

(54) DEVICES, SYSTEMS, AND METHODS FOR PROVISIONING AND UPDATING SECURITY INFORMATION AND EVENT MANAGEMENT ARTIFACTS FOR MULTIPLE TENANTS

(71) Applicant: BlueVoyant LLC, New York, NY (US)

(72) Inventors: Dorian Birsan, Ontario (CA); Chee Wai Ooi, New York, NY (US)

(73) Assignee: BlueVoyant LLC, New York, NY (US)

( * ) Notice: Subject to any disclaimer, the term of this patent is extended or adjusted under 35 U.S.C. 154(b) by 0 days.

(21) Appl. No.: 18/685,831

(22) PCT Filed: Dec. 21, 2022

(86) PCT No.: PCT/US2022/082167
§ 371 (c)(1),
(2) Date: Feb. 22, 2024

(87) PCT Pub. No.: WO2023/129851
PCT Pub. Date: Jul. 6, 2023

(65) Prior Publication Data
US 2024/0267403 A1 Aug. 8, 2024

Related U.S. Application Data

(60) Provisional application No. 63/294,570, filed on Dec. 29, 2021.

(51) Int. Cl.
*H04L 9/40* (2022.01)
(52) U.S. Cl.
CPC ...... *H04L 63/1441* (2013.01); *H04L 63/1416* (2013.01)
(58) Field of Classification Search
CPC .................. H04L 63/1441; H04L 63/1416
See application file for complete search history.

(56) References Cited

U.S. PATENT DOCUMENTS

| 1,099,164 A | 6/1914 | Carter |
| 11,244,266 B2 | 2/2022 | Fukami et al. |

(Continued)

FOREIGN PATENT DOCUMENTS

| JP | 2015-524592 A | 8/2015 |
| JP | 2019-114172 A | 7/2019 |

(Continued)

OTHER PUBLICATIONS

International Search Report and Written Opinion received for International PCT Application No. PCT/US2022/082167, dated Mar. 15, 2023.

(Continued)

*Primary Examiner* — Alexander Lagor
*Assistant Examiner* — Shu Chun Gao
(74) *Attorney, Agent, or Firm* — K&L Gates LLP

(57) ABSTRACT

A Security Information, and Event Management ("SIEM") provider server is disclosed herein. The SIEM provider server is configured to enhance network security on behalf of a tenant network by autonomously generating and providing an SIEM configuration to the tenant network. The SIEM provider server includes a processor and a memory configured to store a managed security service provider ("MSSP") management system that, when executed by the processor, causes the processor to autonomously retrieve an SIEM artifact associated with the tenant network from a content repository; generate a tenant-specific SIEM configuration for the tenant network including the SIEM artifact; and deploy the tenant-specific SIEM configuration to a tenant-specific repository.

20 Claims, 3 Drawing Sheets

(56) References Cited

U.S. PATENT DOCUMENTS

| | | | |
|---|---|---|---|
| 2012/0072716 A1 | 3/2012 | Hu et al. | |
| 2013/0291087 A1 | 10/2013 | Kailash et al. | |
| 2014/0032228 A1 | 1/2014 | Johri et al. | |
| 2015/0188949 A1 | 7/2015 | Mahaffey et al. | |
| 2017/0041296 A1* | 2/2017 | Ford | G06F 21/64 |
| 2017/0155672 A1 | 6/2017 | Muthukrishnan et al. | |
| 2017/0331829 A1 | 11/2017 | Lander et al. | |
| 2020/0259847 A1 | 8/2020 | Loomis et al. | |
| 2021/0326744 A1* | 10/2021 | Israel | G06N 5/02 |

FOREIGN PATENT DOCUMENTS

| | | | | |
|---|---|---|---|---|
| WO | 2017196774 A1 | 11/2017 | | |
| WO | 2018134865 A1 | 7/2018 | | |
| WO | 2022256832 A1 | 12/2022 | | |
| WO | WO-2022256833 A1 * | 12/2022 | | G06F 21/552 |
| WO | 2023129851 A1 | 7/2023 | | |

OTHER PUBLICATIONS

Jammal et al. "Software defined networking: State of the art and research challenges." Computer Networks 72 (2014): 74-98. Oct. 29, 2014 (Oct. 29, 2014) Retrieved on Feb. 20, 2023 (Feb. 20, 2023).

Extended European Search Report for corresponding European Application No. 22917471.9, mailed Dec. 4, 2024.

* cited by examiner

3000

3002
Display a plurality of widgets, wherein at least one widget of the plurality of widgets is associated with the tenant network

3004
Autonomously retrieve an SIEM artifact associated with the tenant network from a content repository

3006
Generate a tenant-specific SIEM implementation for the tenant network including the SIEM artifact

3008
Deploy the tenant-specific SIEM implementation to the tenant network via a tenant-specific repository

FIG. 3

DEVICES, SYSTEMS, AND METHODS FOR PROVISIONING AND UPDATING SECURITY INFORMATION AND EVENT MANAGEMENT ARTIFACTS FOR MULTIPLE TENANTS

CROSS-REFERENCE TO RELATED APPLICATIONS

This application is a U.S. National Stage Entry under 35 U.S.C. § 371 of International Patent Application No. PCT/US2022/082167, entitled DEVICES, SYSTEMS, AND METHODS FOR PROVISIONING AND UPDATING SECURITY INFORMATION & EVENT MANAGEMENT ARTIFACTS FOR MULTIPLE TENANTS, filed Dec. 21, 2022, which claims benefit under 35 U.S.C. § 119 (e) to U.S. Provisional Patent Application No. 63/294,570, titled DEVICES, SYSTEMS, AND METHODS FOR PROVISIONING AND UPDATING SECURITY INFORMATION & EVENT MANAGEMENT ARTIFACTS FOR MULTIPLE TENANTS filed Dec. 29, 2021, the disclosure of which is hereby incorporated by reference in its entirety.

FIELD

The present disclosure is generally related to network security, and, more particularly, is directed to improved devices, systems, and methods for issuing Security Information, and Event Management (SIEM) client updates.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, a Security Information, and Event Management ("SIEM") provider server is disclosed. The SIEM provider server can be configured to enhance network security on behalf of a tenant network by autonomously generating and providing an SIEM configuration to the tenant network. The SIEM provider server can include a processor and a memory configured to store a managed security service provider ("MSSP") management system that, when executed by the processor, causes the processor to autonomously retrieve an SIEM artifact associated with the tenant network from a content repository; generate a tenant-specific SIEM configuration for the tenant network comprising the SIEM artifact; and deploy the tenant-specific SIEM configuration to a tenant-specific repository.

In various aspects, a method of enhancing network security on behalf of a tenant network is disclosed. The method can include autonomously generating and providing an SIEM configuration to the tenant network via a Security Information, and Event Management ("SIEM") provider server; displaying, via a graphical user interface, a plurality of widgets, wherein at least one widget of the plurality of widgets is associated with the tenant network; autonomously retrieving, via the SIEM provider server, an SIEM artifact associated with the tenant network from a content repository communicably coupled to the SIEM provider server; generating, via the SIEM provider server, a tenant-specific SIEM configuration for the tenant network including the SIEM artifact; deploying, via the SIEM provider server, the tenant-specific SIEM configuration to the tenant network via a tenant-specific repository communicably coupled to the SIEM provider server; continuously monitoring, via the SIEM configuration, the tenant network for security events; and autonomously taking an action, via the SIEM configuration, to secure the tenant network upon detecting a security event.

In various aspects, a system for enhancing network security is disclosed. The system can include: a centralized content repository; a plurality of tenant-specific repositories; a plurality of tenants configured to host a plurality of clients; and a Security Information, and Event Management (SIEM) provider server communicably coupled to the plurality of tenants, wherein the SIEM provider server includes a processor, and a memory, wherein the memory is configured to store a MSSP management platform that, when executed by the processor, causes the processor to: provide a graphical user interface displaying a plurality of widgets, wherein each widget of the plurality of widgets is associated with a tenant of the plurality of tenants; receive, via the graphical user interface, a user input associated with a target tenant of the plurality of tenants; autonomously retrieve an SIEM artifact associated with the target tenant from the content repository; generate a tenant-specific SIEM configuration for the target tenant including the SIEM artifact, wherein the tenant-specific SIEM configuration is configured to continuously monitor the target tenant for security events and, upon detecting a security event, autonomously take an action to secure the target tenant; and deploy the tenant-specific SIEM configuration to a tenant-specific repository of the plurality of tenant-specific repositories associated with the target tenant.

These, and other objects, features, and characteristics of the present invention, as well as the methods of operation, and functions of the related elements of structure, and the combination of parts, and economies of manufacture, will become more apparent upon consideration of the following description, and the appended claims with reference to the accompanying drawings, all of which form a part of this specification, wherein like reference numerals designate corresponding parts in the various figures. It is to be expressly understood, however, that the drawings are for the purpose of illustration, and description only, and are not intended as a definition of the limits of the invention.

BRIEF DESCRIPTION OF THE DRAWINGS

Various features of the aspects described herein are set forth with particularity in the appended claims. The various aspects, however, both as to organization, and methods of operation, together with advantages thereof, may be understood in accordance with the following description taken in conjunction with the accompanying drawings as follows:

FIG. 3 illustrates a method of provisioning and updating security information and event management artifacts, in accordance with at least one non-limiting aspect of the present disclosure.

Corresponding reference characters indicate corresponding parts throughout the several views. The exemplifications set out herein illustrate various aspects of the invention, in one form, and such exemplifications are not to be construed as limiting the scope of the invention in any manner.

DETAILED DESCRIPTION

Figure 1:
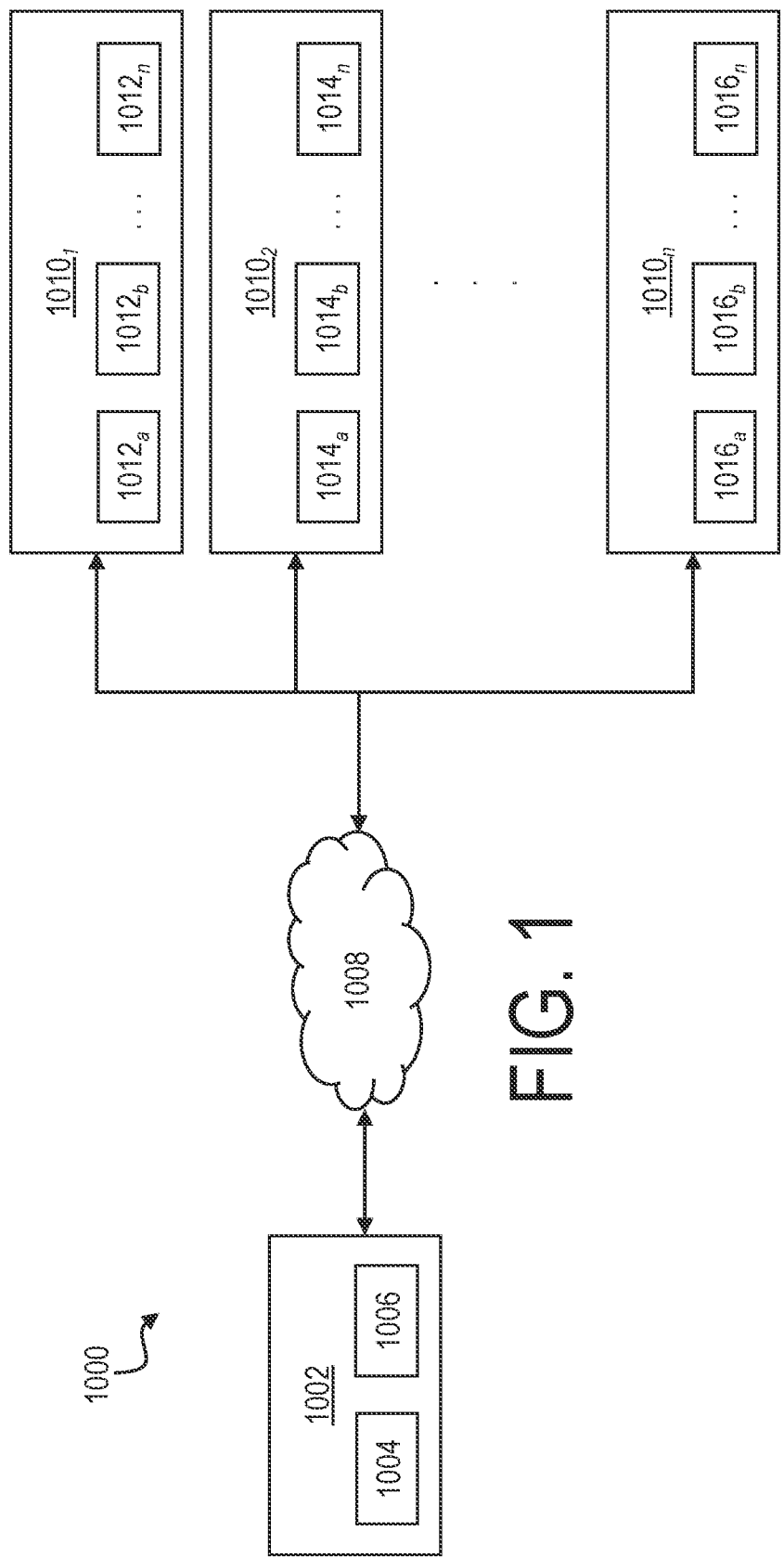
FIG. 1 illustrates a diagram of a system configured to standardize and streamline the deployment of security information and event management artifacts for multiple tenants, in accordance with at least one non-limiting aspect of the present disclosure.

The Applicant of the present application also owns the following U.S. Provisional Patent Applications, the disclosure of each of which is herein incorporated by reference in its entirety:

U.S. Provisional Patent Application No. 63/295,150 titled DEVICES, SYSTEMS, AND METHODS FOR STREAMLINING AND STANDARDIZING THE INGEST OF SECURITY DATA ACROSS MULTIPLE TENANTS, filed on Dec. 30, 2021;

U.S. Provisional Patent Application No. 63/302,828 titled DEVICES, SYSTEMS, AND METHODS FOR REMOTELY MANAGING ANOTHER ORGANIZATION'S SECURITY ORCHESTRATION, AUTOMATION, AND RESPONSE, filed on Jan. 25, 2022;

U.S. Provisional Patent Application No. 63/313,422 titled DEVICES, SYSTEMS, AND METHODS FOR IDENTIFYING CYBER ASSETS AND GENERATING CYBER RISK MITIGATION ACTION BASED ON DOMAIN REDIRECTS, filed on Feb. 24, 2022;

U.S. Provisional Patent Application No. 63/341,264 titled DEVICES, SYSTEMS, AND METHODS FOR SUMMARIZING ANALYTIC OBSERVATIONS, filed on May 12, 2022;

U.S. Provisional Patent Application No. 63/344,305 titled DEVICES, SYSTEMS, AND METHODS FOR INGESTING & ENRICHING SECURITY INFORMATION TO AUTONOMOUSLY SECURE A PLURALITY OF TENANT NETWORKS, filed on May 20, 202;

U.S. Provisional Patent Application No. 63/345,679 titled DEVICES, SYSTEMS, AND METHODS FOR IDENTIFYING CYBER ASSETS AND GENERATING CYBER RISK MITIGATION ACTIONS BASED ON A DEMOCRATIC MATCHING ALGORITHM, filed on May 25, 2022

International Patent Application No. PCT/US22/72739, titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS, filed on Jun. 3, 2022;

International Patent Application No. PCT/US22/72743, titled DEVICES, SYSTEMS, AND METHODS FOR STANDARDIZING & STREAMLINING THE DEPLOYMENT OF SECURITY INFORMATION & EVENT MANAGEMENT ARTIFACTS FOR MULTIPLE TENANTS, filed on Jun. 3, 2022;

U.S. Provisional Patent Application No. 63/365,819 titled DEVICES, METHODS, AND SYSTEMS FOR GENERATING A HIGHLY-SCALABLE, EFFICIENT COMPOSITE RECORD INDEX, filed on Jun. 3, 2022

U.S. Provisional Patent Application No. 63/353,992 titled DEVICES, SYSTEMS, AND METHODS FOR CATEGORIZING, PRIORITIZING, AND MITIGATING CYBER SECURITY RISKS, filed on Jun. 21, 2022;

U.S. Provisional Patent Application No. 63/366,903 titled DEVICES, SYSTEMS, AND METHOD FOR GENERATING AND USING A QUERYABLE INDEX IN A CYBER DATA MODEL TO ENHANCE NETWORK SECURITY, filed on Jun. 23, 2022;

U.S. Provisional Patent Application No. 63/368,567 titled DEVICES, SYSTEMS, AND METHODS FOR UTILIZING A NETWORKED, COMPUTER-ASSISTED, THREAT HUNTING PLATFORM TO ENHANCE NETWORK SECURITY, filed on Jul. 15, 2022;

U.S. Provisional Patent Application No. 63/369,582 titled AUTONOMOUS THREAT SCORING AND SECURITY ENHANCEMENT, filed on Jul. 27, 2022;

U.S. Provisional Patent Application No. 63/377,304, titled DEVICES, SYSTEMS, AND METHODS FOR CONTINUOUSLY ENHANCING THE IMPLEMENTATION OF CODE CHANGES VIA ENRICHED PIPELINES, filed on Sep. 27, 2022

Numerous specific details are set forth to provide a thorough understanding of the overall structure, function, manufacture, and use of the aspects as described in the disclosure, and illustrated in the accompanying drawings. Well-known operations, components, and elements have not been described in detail so as not to obscure the aspects described in the specification. The reader will understand that the aspects described, and illustrated herein are non-limiting aspects, and thus it can be appreciated that the specific structural, and functional details disclosed herein may be representative, and illustrative. Variations, and changes thereto may be made without departing from the scope of the claims. Furthermore, it is to be understood that such terms as "forward", "rearward", "left", "right", "upwardly", "downwardly", and the like are words of convenience, and are not to be construed as limiting terms.

Numerous specific details are set forth to provide a thorough understanding of the overall structure, function, manufacture, and use of the aspects as described in the disclosure, and illustrated in the accompanying drawings. Well-known operations, components, and elements have not been described in detail so as not to obscure the aspects described in the specification. The reader will understand that the aspects described, and illustrated herein are non-limiting aspects, and thus it can be appreciated that the specific structural, and functional details disclosed herein may be representative, and illustrative. Variations, and changes thereto may be made without departing from the scope of the claims. Furthermore, it is to be understood that such terms as "forward", "rearward", "left", "right", "upwardly", "downwardly", and the like are words of convenience, and are not to be construed as limiting terms.

In the following description, like reference characters designate like or corresponding parts throughout the several views of the drawings. Also in the following description, it is to be understood that such terms as "forward", "rearward", "left", "right", "upwardly", "downwardly", and the like are words of convenience, and are not to be construed as limiting terms.

Before explaining various aspects of the systems, and methods disclosed herein in detail, it should be noted that the illustrative aspects are not limited in application or use to the details of disclosed in the accompanying drawings, and description. It shall be appreciated that the illustrative aspects may be implemented or incorporated in other aspects, variations, and modifications, and may be practiced or carried out in various ways. Further, unless otherwise indicated, the terms, and expressions employed herein have been chosen for the purpose of describing the illustrative aspects for the convenience of the reader, and are not for the purpose of limitation thereof. For example, it shall be appreciated that any reference to a specific manufacturer, software suite, application, or development platform disclosed herein is merely intended to illustrate several of the many aspects of the present disclosure. This includes any, and all references to trademarks. Accordingly, it shall be appreciated that the devices, systems, and methods disclosed herein can be implemented to enhance any software update, in accordance with any intended use, and/or user preference.

As used herein, the term "server" may refer to or include one or more computing devices that are operated by or facilitate communication, and processing for multiple parties in a network environment, such as the Internet or any public or private network. Reference to "a server" or "a processor," as used herein, may refer to a previously-recited server, and/or processor that is recited as performing a previous step or function, a different server, and/or processor, and/or a combination of servers, and/or processors.

As used herein, the term "tenant" may refer to one or more client organizations managed by a managed security service provider ("MSSP"). Tenants can include one or more servers configured to manage a network, such as an intranet, by which numerous client instances are connected. For example, a "client" or "client instance," as used herein, can include a computing device (e.g., a laptop, a desktop computer, a mobile phone, etc.) that is connected to the tenant's network. According to some non-limiting aspects, a "client" or "client instance" can be a software agent, or a computing device external to the tenant's network that is connected via a virtual private network ("VPN") connection.

As used herein, the term "constant" may refer to one or more SIEM functions that remain unchanged during the issuance of an alert. For example, a constant can include an Azure Sentinel Log Analytics function, amongst others. According to some non-limiting aspects, a constant can be specifically configured in accordance with an individual client's preferences and/or requirements. For example, alert rules, as described herein, can be the same for all client deployments. However, the apparatuses, systems, and methods disclosed herein can employ client-specific constants to "fine tune" how alerts are managed for each particular client. In other words, each constant can include a whitelist of specific protocols, accounts, etc. which the alert rule manages those constants differently (e.g., skips them).

As used herein, the term "network" can include an entire enterprise information technology ("IT") system, as deployed by a tenant. For example, a network can include a group of two or more nodes (e.g., assets) connected by any physical and/or wireless connection and configured to communicate and share information with the other node or nodes. However, the term network shall not be limited to any particular nodes or any particular means of connecting those nodes. A network can include any combination of assets (e.g., devices, servers, desktop computers, laptop computers, personal digital assistants, mobile phones, wearables, smart appliances, etc.) configured to connect to an ethernet, intranet, and/or extranet and communicate with one another via an ad hoc connection (e.g., Bluetooth®, near field communication ("NFC"), etc.), a local area connection ("LAN"), a wireless local area network ("WLAN"), and/or a virtual private network ("VPN"), regardless of each devices' physical location. A network can further include any tools, applications, and/or services deployed by devices, or otherwise utilized by an enterprise IT system, such as a firewall, an email client, document management systems, office systems, etc. In some non-limiting aspects, a "network" can include third-party devices, applications, and/or services that, although they are owned and controlled by a third party, are authorized by the tenant to access the enterprise IT system.

As used herein, the term "platform" can include software architectures, hardware architectures, and/or combinations thereof. A platform can include either a stand-alone software product, a network architecture, and/or a software product configured to integrate within a software architecture and/or a hardware architecture, as required for the software product to provide its technological benefit. For example, a platform can include any combination of a chipset, a processor, a logic-based device, a memory, a storage, a graphical user interface, a graphics subsystem, an application, and/or a communication module (e.g., a transceiver). In other words, a platform can provide the resources required to enable the technological benefits provided by software. According to some non-limiting aspects, the technological benefit provided by the software is provided to the physical resources of the ecosystem or other software employed by physical resources within the ecosystem (e.g., APIs, services, etc.). According to other non-limiting aspects, a platform can include a framework of several software applications intended and designed to work together.

Security Information, and Event Management ("SIEM") includes software configured to aggregate and analyze activity from many different resources across an entire information technology (IT) infrastructure. For example, SIEM can be implemented to aggregate data from multiple systems, and analyze that data to catch abnormal behavior or potential cyberattacks. For example, SIEM may collect security data from network devices, servers, domain controllers, and more. SIEM can be implemented to store, normalize, aggregate, and apply analytics to that data to discover trends, detect threats, and enable organizations to investigate any alerts. Although known SIEM tools offer impressive functionality, including the ability to monitor events, collect data, and issue security alerts across a network, such tools are typically tailored for an implementing organization, and—more specifically—a particular network architecture, which can oftentimes be complex. Accordingly, SIEM can be expensive, resource intensive, and often it may be difficult to resolve problems with SIEM data.

One example of SIEM is Azure Sentinel, a popular, cloud-based tool. However, deploying Azure Sentinel requires a high level of skill, and, at the same time, it could be very time consuming, and error prone. Each organization that needs a security solution has special needs around monitoring, and alerting, the log sources to ingest, the detection/alert rules, the response automation, reporting, etc. Although Microsoft (MSFT) is often used by security services providers ("MSSP") to manage multiple clients, the complexity of the initial configuration, deployment, and ongoing maintenance of artifacts (e.g., resource groups, log analytics workspaces, alert rules, workbooks, playbooks, etc.), has been increasing significantly. This can result in a high cost for both the MSSP—who must hire more expensive specialists—and for the client, who often bears at least a portion of the increasing expenses. However, there is often an overlap between some of the deployment needs of varying clients. For example, many organizations may require similar firewall monitoring solutions. In such instances, asset reuse, and re-deployment (and update) may lead to major cost reduction, and simplicity of operations. Unfortunately, known SIEM tools are technologically incapable of taking advantage of such synergies. Thus, from the initial provisioning, and throughout the automation of incident responses, MSSPs are left with limited re-use opportunities and cannot capture efficiencies across multiple clients.

Furthermore, the need for scalable SIEM services is accompanied by an emerging need to quickly provision, or configure, an SIEM platform, such that the MSSP can immediately begin monitoring the security of new clients. Once configured, the SIEM must also be updated on a recurring (e.g., daily, weekly, monthly, etc.) and/or ad hoc basis. Since information technology requirements and security threats are continually evolving, such SIEM updates should be able to address new client needs (e.g., new log sources) and should include new security content (e.g., alerts, playbooks, etc.). Accordingly, there is a need for improved devices, systems, and methods for provisioning and updating SIEM artifacts for multiple tenants. Such improvements could be provided via a hybrid platform configured for provisioning and updating SIEMs for a plurality of tenants, regardless of scale. The platform should be capable of easily configuring an SIEM for new clients and managing an SIEM for existing clients using one or more repositories and a scripting infrastructure that is generated and maintained by a graphical user interface, without requiring the manual revision of scripts. In other words, systems and platforms disclosed herein should be fully automated to enable a large scale of operations without requiring a high level of operator expertise. Thus, such systems and platforms can reduce the level of maintenance and expense required by conventional MSSP and SIEM platforms.

The present disclosure contemplates such devices, systems, and methods, all of which provide many technological benefits over conventional MSSP and SIEM platforms. For example, conventional MSSP devices, systems, and methods lack the automation, artifacts, and interfaces required to seamlessly scale an MSSP platform such that SIEM services can be provided to hundreds, if not thousands, of tenant networks. Rather, conventional MSSP devices, systems, and methods require manual integration and management, meaning they are less efficient and more expensive. Moreover, conventional MSSP devices, systems, and methods require each tenant network to share the manual resources employed by the MSSP, rendering each tenant network less secure. In contrast, the devices, systems, and methods disclosed herein are highly automated and thus, configured to enable an MSSP to continuously monitor a tenant's network and clients in real-time. Not only are conventional MSSP devices, systems, and methods technologically incapable of such automation, but it would be highly impractical—if not impossible—for an MSSP to manually continuously monitor hundreds, if not thousands, of tenant networks in real-time. The devices, systems, and methods disclosed herein are also technologically configured to be adaptable. In conjunction with being highly scalable, this adaptability enables and MSSP to track changes across a high volume of tenant deployments, monitor responses to those changes, and autonomously implement them for any applicable tenant deployment that could similarly benefit from them. In other words, conventional MSSP devices, systems, and methods are inherently more prone security events and thus, technologically less secure than the devices, systems, and methods disclosed herein.

For example, the devices, systems, and methods disclosed herein can provide: (1) a means of dynamically plugging-in a solution bundle (e.g., JavaScript Object Notation ("JSON") based bundle, a Yet Another Markup Language ("YAML") bundle, a JavaScript bundle, Python bundle, etc.) of various Sentinel artifacts (e.g., resource groups, log analytics workspaces, data connectors, alert rules, playbooks, workbooks, etc.), which shall be referred to as a "sentinel-in-a-Box," herein; (2) a visual interface for an authorized user to select a desired sentinel-in-a-box bundle; (3) an action button to "deploy" the selected bundle to a user's desired SIEM subscription, essentially creating all the necessary artifacts (e.g., resource group, log analytics workspace, etc.), configuring appropriate data connectors (specific to the chosen bundle), and creating the analytics/alert rules needed for the solution, as well as any playbook, workbooks, queries, as needed by the particular bundled configuration; (4) Configures the back end service operating center (SOC) to onboard a new client, with well defined automation rules in response to the events triggered by the alerts/detections configured for the particular bundle; and (5) an MSSP/CSP model: a service provider who has access to their clients Azure environment (e.g., via Azure Lighthouse, etc.) can deploy bundles, on behalf of their clients, into each client workspace. Accordingly, the bundle provider only manages the relationship with the MSSP/CSP, with enough filtering by client workspace in responding to specific alerts/incidents. This could be important for the efficiency of billing, support, and avoiding unnecessary client interactions.

Referring now to FIG. 1, a diagram of a system 1000 configured to enhance SIEM updates is depicted in accordance with at least one non-limiting aspect of the present disclosure. For example, according to some non-limiting aspects, the system 1000 of FIG. 1 is similar to those disclosed in U.S. Provisional Patent Application No. 63/196,991, titled DEVICES, SYSTEMS, AND METHODS FOR STANDARDIZING AND STREAMLINING THE DEPLOYMENT OF SECURITY INFORMATION AND EVENT MANAGEMENT ARTIFACTS FOR MULTIPLE TENANTS, filed Jun. 4, 2021. According to the non-limiting aspect of FIG. 1, the system 1000 can include a SIEM provider server 1002 comprising a memory 1006 configured to store a SIEM management application 102, and a processor 1004 configured to execute the stored SIEM management application 102, as will be discussed in further reference to FIG. 2. For example, the SIEM provider server 1002 can be a computational resource either owned or leased by the MSSP. The SIEM provider server 1002 can be communicably coupled, via network 1008, to a plurality of tenants $1010a$, $1010b$ . . . $1010n$. Each tenant $1010_1$, $1010_2$ . . . $1010_n$ of the plurality can represent a customer (e.g., organization) contracting with the MSSP. According to the non-limiting aspect of FIG. 1, the network 1008 can include any variety of wired, long-range wireless, and/or short-range wireless networks. For example, the network 1008 can include an internal intranet, a Local Area Networks (LAN), WiFi®, cellular networks, near-field communication (hereinafter "NFC"), amongst others.

In further reference to FIG. 1, each tenant $1010_1$, $1010_2$ . . . $1010_n$ of the plurality can host one or more instances of one or more clients 1012, 1014, 1016. For example, a first tenant $1010_1$ can include one or more machines implementing one or more client applications $1012_1$, $1012_2$ . . . $1012_n$, a second tenant $1010_2$ can include one or more machines implementing one or more client applications $1014_1$, $1014_2$ . . . $1014_n$, and/or a third tenant $1010_n$ can include one or more machines implementing one or more client applications $1016_1$, $1016_2$ . . . $1016_n$. Each tenant $1010_1$, $1010_2$, and $1010_n$ can include an intranet by which each machine implementing the client applications For example, each tenant $1010_1$, $1010_2$, and $1010_n$ can each represent a customer, such as an organization, contracting with the MSSP for security services. Accordingly, the SIEM provider server 1002 can be configured to have oversight of each tenant $1010_1$, $1010_2$, and $1010_n$ of the plurality, and, thus, is responsible for monitoring, and managing each client application 1012, 1014, 1016 for threats. As previously discussed, the differences, and complexity in tenant $1010_1$, $1010_2$, and $1010_n$ architecture can complicate this, and render it inefficient for the MSSP. Thus, known SIEM tools can leave the tenants $1010_1$, $1010_2$, and $1010_n$, technologically exposed, and thus, vulnerable to attacks. According to non-limiting aspects of the present disclosure, the SIEM provider server 1002 can implement a SIEM management application 102 that technologically, and practically addresses these deficiencies by enhancing the ability of the SIEM provider server 1002 to manage, and transmit alerts, and client application updates for multiple tenants based on correlated, and synergistic development needs.

Figure 2:
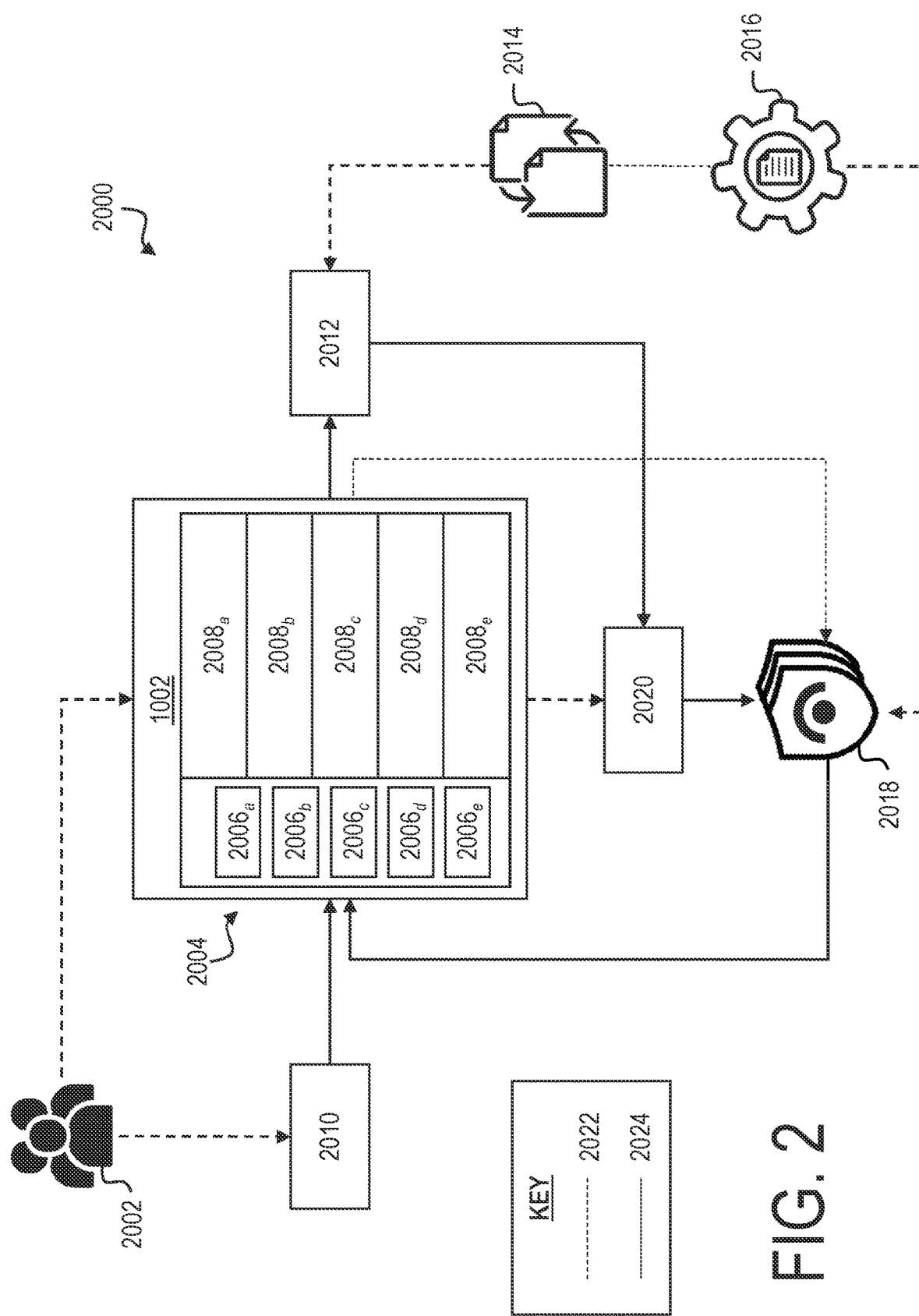
FIG. 2 illustrates a block diagram of a deployment architecture employed by the system of FIG. 1, in accordance with at least one non-limiting aspect of the present disclosure.

Referring now to FIG. 2, a block diagram of a deployment architecture 2000 employed by the system 1000 of FIG. 1 is depicted in accordance with at least one non-limiting aspect of the present disclosure. According to the non-limiting aspect of FIG. 2, a user 2002 (e.g., an MSSP) can access an MSSP platform 2004 that includes a graphical user interface featuring a plurality of widgets $2006_{a-e}$, $2008_{a-e}$ by which the user 2002 can initiate the provisioning and/or updating of an SIEM for a plurality of tenants $1010_{1-n}$ (FIG. 1). The MSSP platform 2004 can be stored in the memory 1006 of the SIEM provider server 1002 (FIG. 1) and, when executed by the processor 1004 (FIG. 1) of the SIEM provider server 1002 (FIG. 1), the graphical user interface can be presented on a display communicably coupled to the SIEM provider server 1002 (FIG. 1). According to some non-limiting aspects, the MSSP platform 2004 of FIG. 2 can be similar to those disclosed in U.S. Provisional Patent Application No. 63/196,458, titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS, filed Jun. 3, 2021. However, the MSSP platform 2004 of FIG. 2 can include alternate mechanisms that facilitate enhanced SIEM provisioning, management, and updating, as will be described in further detail herein. In other words, the MSSP management platform 2004 can include a visual representation, or "dashboard," configured to display data, trends, and/or anomalies associated with security activities and events across the plurality of tenants $1010_{1-n}$ (FIG. 1). Different lines of communication 2022, 2024 between the system components of the architecture are further illustrated. For example, a first line of communication 2022 can indicate one component of the hybrid-based approach, where a user interacts with a portal, such as those disclosed in U.S. Provisional Patent Application No. 63/196,458, titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS, filed Jun. 3, 2021, the disclosure of which is hereby incorporated by reference in its entirety, to directly provision and manage content in the target SIEM. Other lines of communication 2024 can facilitate background processes. For example, according to one non-limiting aspect of the present disclosure, a command-line utility, such as a cron job, can be scheduled to continuously read a tenant's $1010_{1-n}$ (FIG. 1) SIEM and update a state of that tenant's $1010_{1-n}$ (FIG. 1) SIEM (e.g., update deployed SIEM artifacts in accordance with those maintained in a client-specific repository, such as content repository 2010).

According to the non-limiting aspect of FIG. 2, the SIEM provider server 1002 (FIG. 1) can be communicably coupled to a content repository 2010, which can be accessed by the user 2002 via the MSSP platform 2004. The content repository 2010, via the MSSP management platform 2004, can enable a user 2002 to search and retrieve such content. Additionally, the content repository 2010 can be configured to actively interface with the MSSP management platform 2004 such that the MSSP platform 2004 can autonomously access, correlate, and implement content within the repository 2010 for a tenant-specific configuration. The MSSP platform 2004, in conjunction with the content repository 2010, can visualize available artifacts for tenant $1010_{1-n}$ (FIG. 1) specific SIEM deployments, available changes for the SIEM deployments, and various other deployment tasks. According to some non-limiting aspects, the content repository 2010 can be client-specific. However, according to other non-limiting aspects, the content repository 2010 can be provided via a third-party (e.g., Splunk, Sentinel, GitHub, etc.). Regardless, the content repository 2010 can be a database configured to store digital content, such as artifacts and/or SIEM configuration and management solutions (e.g., resource groups, log analytics workspaces, data connectors, alert rules, playbooks, workbooks, etc.). For example, artifacts can include the alert rules, playbooks, workbooks, data connectors, and/or parsers disclosed in U.S. Provisional Patent Application No. 63/196,458, titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS, filed Jun. 3, 2021, the disclosure of which is hereby incorporated by reference in its entirety. According to other non-limiting aspects, artifacts can include Splunk artifacts, such as correlations, dashboards, searches, etc.

For example, the content repository 2010 can store a workbook, which can assist in visualizing data associated with each of the clients $1012_{a-n}$, $1014_{a-n}$, $1016_{a-n}$ of the plurality of tenants $1010_{1-n}$ (FIG. 1). Additionally and/or alternatively, the content repository 2010 can store a playbook, or protocols which can be run by the SIEM provider server 1002 and/or the tenant $1010_{1-n}$ (FIG. 1) in response to a security event and/or an alert, at the direction of the MSSP platform 2004. Generally, the SIEM configuration 2018 can be configured to secure a network on behalf of each of the tenants $1010_{1-n}$ (FIG. 1). For example, the SIEM configuration 2018 can monitor the network for a security event, and take an action to secure the network. According to some non-limiting aspects, the action can include issuing an alert to an MSSP user 2002 and/or an administrative account for the tenant $1010_{1-n}$ (FIG. 1). However, according to some non-limiting aspects, the SIEM configuration 2018 can identify and remove a suspect account from the tenant $1010_{n-1}$ network based on one or more artifacts.

For example, according to some non-limiting aspects, artifacts can include alert rules (e.g. Sentinel alerts) or correlations (e.g., Splunk correlations), either of which can query specific logs, for specific anomalies, on set schedules, and alert the SIEM accordingly (e.g., issue an alert and/or generate a security incident upon triggering the rule and/or correlation). According to the hybrid approach contemplated by the present disclosure, the aforementioned mechanism can be applied to any of artifacts disclosed herein, although specific provisioning details may be attenuated (e.g., API's can be used to push to artifacts to the SIEM, on-the-fly variable substitution/customization can be employed, etc).

As previously discussed, the MSSP management platform 2004 can include a graphical user interface that includes a plurality of widgets $2006_{a-e}$, $2008_{a-e}$ by which the user 2002 can initiate the provisioning and/or updating of an SIEM for a plurality of tenants $1010_{1-n}$ (FIG. 1). For example, according to some non-limiting aspects, the graphical user interface of the MSSP management platform 2004 of FIG. 2 is similar to any of the graphical user interfaces disclosed in U.S. Provisional Patent Application No. 63/196,991, titled DEVICES, SYSTEMS, AND METHODS FOR STANDARDIZING AND STREAMLINING THE DEPLOYMENT OF SECURITY INFORMATION AND EVENT MANAGEMENT ARTIFACTS FOR MULTIPLE TENANTS, filed Jun. 4, 2021. According to the non-limiting aspect of FIG. 2, the graphical user interface can include a first plurality of widgets $2006_{a-e}$, wherein each widget $2006_{a-e}$ of the first plurality of widgets $2006_{a-e}$ corresponds to a tenant $1010_{1-n}$ (FIG. 1) of the plurality of tenants $1010_{1-n}$ (FIG. 1). Additionally, the graphical user interface can include a second plurality of widgets $2008_{a-e}$, wherein each widget $2008_{a-e}$ of the second plurality of widgets $2008_{a-e}$ corresponds to a SIEM configuration and/or SIEM status for each tenant $1010_{1-n}$ (FIG. 1) of the plurality of tenants $1010_{1-n}$ (FIG. 1).

In further reference to FIG. 2, the MSSP management platform 2004 and the SIEM provider server 1002 can be configured for the provision of an SIEM configuration 2018 to a tenant network 2020 of one or more new tenants $1010_{1-n}$ (FIG. 1). For example, according to the non-limiting aspect of FIG. 2, the MSSP management platform 2004 can prompt the user 2002 to select and/or create a desired tenant $1010_{1-n}$ (FIG. 1) profile, as well as a particular artifact (e.g., alerts rules, playbooks, workbooks, etc) to deploy from the content repository 2010 for configuration on the selected tenant $1010_{1-n}$ (FIG. 1). Upon receiving the inputs from the user 2002, the MSSP management platform 2004 can autonomously generate and aggregate the required scripts, customized content, and any other artifacts necessary into a tenant-specific repository 2012.

For example, the content repository 2010 can store a catalog of artifacts (e.g., alert rules, workbooks, etc) either in form that is directly consumable by the target SIEM or at an abstraction level that allows a portal to convert into target SIEM format via direct transformation (e.g., YAML to JSON). According to other non-limiting aspects, more complex transformations can pull client-specific information from the target SIEM (e.g., a subscription identifier, a workspace name, a resource group name in Sentinel, etc.) and make the necessary customizations during the transformation. As the target SIEM artifact formats change, the transformation can be updated once, and automatically applied to all applicable tenants $1010_{1-n}$ (FIG. 1) of the plurality, without having to manually update each deployed artifact. Essentially, because the architecture 2000 enables connected portals to access and retrieve all of target SIEM information, the preparation of artifacts can be fully automated across multiple tenants $1010_{1-n}$ (FIG. 1), based on the defined mapping and transformation of the artifact types. Thus, regardless of the number of instances of each artifact, the architecture 2000 can simultaneously prepare and deploy numerous (e.g., 500) alert rules, regardless of a tenant's $1010_{1-n}$ (FIG. 1) identity (e.g., client specific values are parameterized and substituted during the transformation from a catalog artifact to a deployable artifact).

The use of a tenant-specific repository 2012 differentiates the SIEM provider server 1002 and the MSSP management platform 2004 from conventional MMSP tools since, instead of actually deploying content from the repository 2010 directly to the tenant $1010_{1-n}$ (FIG. 1), the tenant $1010_{1-n}$ (FIG. 1) pulls the content, which has been intelligently and autonomously curated by the MSSP management platform 2004 for the specific tenant $1010_{1-n}$ (FIG. 1), from the tenant-specific repository 2012. Alternately, the MSSP management platform 2004 can include a scripting engine configured to push content from the tenant-specific repository 2012 to the tenant $1010_{1-n}$ (FIG. 1). For example, the scripting engine can include code that takes content from the repository 2010 and pushes it to the SIEM provider server 1002. This can be accomplished via API's in various languages (e.g., Python, JavaScript, Node JavaScript, Terraform scripts, Power Shell scripts with ARM templates, etc.).

In other words, the MSSP management platform 2004 can be specifically configured to autonomously deploy initial SIEM configurations 2018 on behalf of a tenant $1010_{1-n}$ (FIG. 1) or provide the SIEM configuration 2018 to the tenant-specific repository 2012 for the tenant $1010_{1-n}$ (FIG. 1) to deploy on their own accord, depending on the preferences of the tenant $1010_{1-n}$ (FIG. 1). Regardless, the MSSP management platform 2004 can generate a custom SIEM configuration 2018 for a specific tenant $1010_{1-n}$ (FIG. 1) to be provisioned the the tenant $1010_{1-n}$ (FIG. 1). Notably, the MSSP management platform 2004 and the SIEM provider server 1002 of FIG. 2 can facilitate the provision of an SIEM configuration 2018 for a new tenant $1010_{1-n}$ (FIG. 1) without requiring the user 2002 to write new scripts or modify existing scripts to match tenant $1010_{1-n}$ (FIG. 1) specific environment and/or deployment needs.

Additionally, the architecture 2000 of FIG. 2 can further include an SIEM update engine 2014 the MSSP management platform 2004 and the SIEM provider server 1002 of FIG. 2 can be configured to update artifacts stored in the tenant-specific repository 2012 and/or the content repository 2010.

For example, according to some non-limiting aspects, a content repository 2010, such as Gitlab, can is configured with a WebHook that can notify the portal of any content changes (e.g., a new alert rule, a new playbook, etc.) that has been added to the content repository 2010. Accordingly, the architecture 2000 of FIG. 2 can update the files for the existing artifacts and the portal can read the changes in the content repository 2010, analyze those changes, and depending on what each tenant's $1010_{1-n}$ (FIG. 1) specific needs are, the architecture 2000 can perform the appropriate compare/merge and preparation of the delta updates for each tenant repository. In other words, in response to the WebHook notification from the content repository 2010, the portal can generate and push these updates to each tenant $1010_{1-n}$ (FIG. 1) repository, so the artifacts for each tenant $1010_{1-n}$ (FIG. 1) are updated based on what changes in the SIEM content repository 2010.

According to the non-limiting aspect of FIG. 2, the update engine 2014 can be configured to assess existing SIEM configurations 2018, compare one or more SIEM configurations 2018 deployed across one ore more tenants $1010_{1-n}$ (FIG. 1), notify the MSSP, and autonomously determine whether to keep or reject any proposed changes to an existing, tenant-specific SIEM configuration 2018. As content is updated, the changes are registered via the MSSP management platform 2004 and displayed via the graphical user interface and/or by a job scheduling engine 2016, such as a cron command-line utility or equivalents. In some non-limiting aspects, the job scheduling engine 2016 may be provided by a third party. Accordingly, the MSSP management platform 2004 and the SIEM provider server 1002 can autonomously ensure the tenant-specific repository 2012 has the most up-to-date SIEM configuration 2018 for the tenant's $1010_{1-n}$ (FIG. 1) specific environment and/or deployment needs, which renders tenant-specific repository 2012 prepared for the provision of future SIEM configurations 2018 and/or updates.

Still referring to FIG. 2, the SIEM provider server 1002 can be configured to monitor the tenant-specific repository 2012 and/or the content repository 2010 for content changes via custom callbacks. For example, according to some non-limiting aspects, the MSSP management server 1002 can utilize autonomously initiate periodic webhooks and/or queries for content changes in the tenant-specific repository 2012 and/or the content repository 2010 and correlate, assess any detected changes for applicability to each tenant-specific repository 2012 and, upon determining that a detected change is applicable to a tenant-specific repository 2012, programmatically push each change to the applicable tenant-specific repository 2012. Further distinguishing the MSSP management platform 2004 and the SIEM provider server 1002 from conventional devices is the ability to update the tenant-specific repository 2012 without requiring custom code. Furthermore, the MSSP management platform 2004 and the SIEM provider server 1002 provide a simultaneous "one-click" SIEM update process for large numbers of tenants $1010_{1-n}$ (FIG. 1), in spite of their specific environment and deployment needs, due to the scalability of the system 1000 (FIG. 1), as described further in U.S. Provisional Patent Application No. 63/196,458, titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS, filed Jun. 3, 2021, the disclosure of which is hereby incorporated by reference in its entirety.

Similar to the initial provisioning of the SIEM configuration 2018 to the tenant $1010_{1-n}$ (FIG. 1), once the content and/or artifacts in the tenant-specific repository 2012 have been updated, the deployment of the system 1000 (FIG. 1) can be configured to update artifacts for any of the previously provisioned SIEM configurations 2018 for any tenant $1010_{1-n}$ of the plurality of tenants $1010_{1-n}$. Specifically, the tenant $1010_{1-n}$ (FIG. 1) can pull the content, which has been intelligently and autonomously updated via the update engine 2014 for the specific tenant $1010_{1-n}$ (FIG. 1), from the tenant-specific repository 2012. Alternately, the MSSP management platform 2004 can include a scripting engine configured to push the updated content from the tenant-specific repository 2012 to the tenant $1010_{1-n}$ (FIG. 1). In other words, the MSSP management platform 2004 can be specifically configured to autonomously update SIEM on behalf of a tenant $1010_{1-n}$ (FIG. 1) or provide the SIEM configuration 2018 to the tenant-specific repository 2012 for the tenant $1010_{1-n}$ (FIG. 1) to deploy on their own accord, depending on the preferences of the tenant $1010_{1-n}$ (FIG. 1). According to some non-limiting aspects, updates to the SIEM configuration 2018 can be managed according a tenant's $1010_{1-n}$ (FIG. 1) lifecycle management, meaning the $1010_{1-n}$ (FIG. 1) may first approve the changes pushed to the tenant-specific repository 2012 before being deployed to the SIEM configuration 2018, itself. Regardless, the MSSP management platform 2004 can customize and deploy an update for the SIEM configuration 2018 for a specific tenant $1010_{1-n}$ (FIG. 1).

For example, according to some non-limiting aspects, the MSSP management server 1002 can include a scripting engine configured to generate a script (e.g., repository command reference, a repository "commit" command, etc.) which autonomously initiates a periodic webhook and/or a query for content changes in the tenant-specific repository 2012 and/or the content repository 2010 and correlate, assess any detected changes for applicability to each tenant-specific repository 2012. Upon determining that a detected change is applicable to a tenant-specific repository 2012, the MSSP management server 1002 can programmatically push each change to the applicable tenant-specific repository 2012. This approach can further be enhanced to have the tenant-specific repository 2012 shared between groups of tenants $1010_{1-n}$ (FIG. 1) with similar environments and/or deployment needs.

According to some non-limiting aspects, a tenant $1010_{1-n}$ (FIG. 1) may want to make changes in their own environments. For example, a tenant $1010_{1-n}$ (FIG. 1) may choose to alter and/or eliminate a deployed alert rule, a workbook, etc. The job scheduling engine 2016, for example a regular cron job, can detect tenant $1010_{1-n}$ (FIG. 1) initiated profile changes and notify the MSSP via the MSSP management platform 2004. The MSSP can then decide whether or not to keep the tenant $1010_{1-n}$ (FIG. 1) initiated changes by providing inputs via the graphical user interface. Additionally, the MSSP management platform 2004 can enable the MSSP to lock the tenant $1010_{1-n}$ (FIG. 1) initiated changes from automatic updates, or can outright reject them such that future implemented updates to the SIEM configuration 2018 will override the tenant $1010_{1-n}$ (FIG. 1) initiated changes.

In further reference to FIG. 2, the architecture 2000 and the system 1000 (FIG. 1) on which it is implemented can allow a user 2002 to perform large scale deployments and updates of SIEM configurations 2018, monitoring changes to deployed SIEM configurations 2018 across a plurality of tenants $1010_{1-n}$ (FIG. 1) via tenant-specific repositories 2012. In conjunction with other SIEM portals, such as those disclosed in U.S. Provisional Patent Application No. 63/196,458, titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS, filed Jun. 3, 2021, the disclosure of which is hereby incorporated by reference in its entirety, can provide a user 2002 with a complete management of deployed SIEM configurations 2018. However, the architecture 2000 of FIG. 2 provides further enhancements, integrating the portal and user interface with a scripted approach that allows updates without user 2002 intervention. According to some non-limiting aspects, the approach can be audited by a tenant $1010_{1-n}$ (FIG. 1). As such, users 2002 can track changes from deployment to deployment and/or rollback previously deployed changes in a far more efficient and scalable way than conventional systems.

Additionally and/or alternatively, the architecture 2000 and the system 1000 (FIG. 1) on which it is implemented can allow a tenant $1010_{1-n}$ (FIG. 1) to control its own SIEM configuration 2018 and make changes to artifacts deployed by the MSSP management platform 2004. However, the MSSP management platform 2004 can detect tenant $1010_{1-n}$ (FIG. 1) initiated changes, captures them in the tenant-specific repository 2012, generate and maintain an update history for the SIEM configuration 2018, while enabling a user 2002 to easily review and lock the tenant $1010_{1-n}$ (FIG. 1) initiated changes.

Currently, virtually all deployments are done manually, or if done via code (e.g., scripts) the MSSP is required to update said code with client specific information. This renders conventional systems error prone and requires a high degree of skill and understanding of the content being updated. As previously discussed, the initial provisioning of an SIEM via a conventional SIEM platform requires an MSSP to manually enter client specific information, such as a deployment location, credentials, and deployment content (e.g., alert rules, etc.). However, whereas conventional SIEM platforms offer clients a graphical user interface through which initial SIEM provisioning and configuration is performed, the MSSP platform 2004 of FIG. 2 can autonomously generate a custom deployment script (e.g., via an ARM template, a terraform, a powershell, etc.) to perform the initial SIEM provision and configuration, programmatically.

Referring now to FIG. 3, a method 3000 of provisioning and updating security information and event management artifacts, in accordance with at least one non-limiting aspect of the present disclosure. According to the non-limiting aspect of FIG. 3, the method 3000 can be performed by a SIEM provider server 1002 (FIGS. 1 and 2). Specifically, the MSSP management platform 2004 (FIG. 2) stored in the memory 1006 (FIG. 1) can cause a processor 1004 (FIG. 1) of the SIEM provider server 1002 (FIGS. 1 and 2) to perform the method 3000. With reference now to FIGS. 1-3, in one aspect of the method 3000, the MSSP platform 2004 (FIG. 2) can include a graphical user interface that displays 3002 a plurality of widgets, wherein at least one widget of the plurality of widgets is associated with tenant network 2020 (FIG. 2). The SIEM provider server 1002 (FIGS. 1 and 2) autonomously retrieves 3004 an SIEM artifact associated with the tenant network 2020 (FIG. 2) from a content repository 2010 (FIG. 2) communicably coupled to the SIEM provider server 1002 (FIGS. 1 and 2). The SIEM provider server 1002 (FIGS. 1 and 2) generates 3006 a tenant-specific SIEM configuration for the tenant network 2020 (FIG. 2) including the SIEM artifact. The SIEM provider server 1002 (FIGS. 1 and 2) deploys 3008 the tenant-specific SIEM configuration to the tenant network 2020 (FIG. 2) via a tenant-specific repository 2012 (FIG. 2) communicably coupled to the SIEM provider server 1002 (FIGS. 1 and 2). According to some non-limiting aspects, the method 3000 can further include updating the tenant-specific SIEM configuration, continuously monitoring the tenant network 2020 (FIG. 2) for security events, and/or autonomously taking an action to secure the tenant network 2020 (FIG. 2) upon detecting a security event.

Various aspects of the subject matter described herein are set out in the following numbered clauses:

Clause 1: A Security Information and Event Management ("SIEM") provider server configured to enhance network security on behalf of a tenant network by autonomously generating and providing an SIEM configuration to the tenant network, wherein the SIEM provider server includes a processor and a memory, wherein the memory is configured to store machine executable instructions to implement a managed security service provider ("MSSP") management system that, when executed by the processor, causes the processor to: provide a graphical user interface displaying a plurality of widgets, wherein at least one widget of the plurality of widgets is associated with the tenant network; autonomously retrieve an SIEM artifact associated with the tenant network from a content repository communicably coupled to the SIEM provider server; generate a tenant-specific SIEM configuration for the tenant network including the SIEM artifact, wherein the tenant-specific SIEM configuration is configured to continuously monitor the tenant network for security events and, upon detecting a security event, autonomously take an action to secure the tenant network; and deploy the tenant-specific SIEM configuration to a tenant-specific repository associated with the tenant network for configuration on the tenant network.

Clause 2: The SIEM provider server according to clause 1, wherein the tenant network is one of a plurality of tenant networks, wherein the tenant-specific SIEM configuration is one of a plurality of tenant-specific SIEM configurations generated by the SIEM provider server, and wherein the SIEM provider server is configured to simultaneously deploy and update each SIEM configuration of the plurality of SIEM configurations on behalf of each tenant network of the plurality of tenant networks.

Clause 3: The SIEM provider server according to clauses 1 or 2, wherein the action includes autonomously removing a suspect account from the tenant network.

Clause 4: The SIEM provider server according to any of clauses 1-3, wherein the target tenant is configured to pull the tenant-specific SIEM configuration from the tenant-specific repository.

Clause 5: The SIEM provider server according to any of clauses 1-4, wherein the MSSP management platform is configured to push the tenant-specific SIEM configuration from the tenant-specific repository to the target tenant.

Clause 6: The SIEM provider server according to any of clauses 1-5, further including a scripting engine configured to generate a script configured to autonomously initiate a periodic query for content changes in the tenant-specific repository.

Clause 7: The SIEM provider server according to any of clauses 1-6, wherein the script is a repository "commit" command.

Clause 8: The SIEM provider server according to any of clauses 1-7, wherein, when executed by the processor, the MSSP management platform further causes the processor to: receive a response to the query generated by the scripting engine; determine that the SIEM configuration includes a tenant-initiated change based on the received response; and autonomously determine to reject tenant-initiated changes to an existing, tenant-specific SIEM configuration.

Clause 9: A method of enhancing network security on behalf of a tenant network by autonomously generating and providing an SIEM configuration to the tenant network via a Security Information, and Event Management ("SIEM") provider server, the method including: displaying, via a graphical user interface, a plurality of widgets, wherein at least one widget of the plurality of widgets is associated with the tenant network; autonomously retrieving, via the SIEM provider server, an SIEM artifact associated with the tenant network from a content repository communicably coupled to the SIEM provider server; generating, via the SIEM provider server, a tenant-specific SIEM configuration for the tenant network including the SIEM artifact; deploying, via the SIEM provider server, the tenant-specific SIEM configuration to the tenant network via a tenant-specific repository communicably coupled to the SIEM provider server; continuously monitoring, via the SIEM configuration, the tenant network for security events; and autonomously taking an action, via the SIEM configuration, to secure the tenant network upon detecting a security event.

Clause 10. The method according to clause 9, wherein the tenant network is one of a plurality of tenant networks, wherein the tenant-specific SIEM configuration is one of a plurality of tenant-specific SIEM configurations generated by the SIEM provider server, and wherein the method further comprises: simultaneously deploying, via the SIEM provider server, each SIEM configuration of the plurality of SIEM configurations to each tenant network of the plurality of tenant networks; and simultaneously updating, via the SIEM provider server, each SIEM configuration of the plurality of SIEM configurations on behalf of each tenant network of the plurality of tenant networks.

Clause 11. The method according to either of clauses 9 or 10, wherein autonomously taking the action comprises autonomously removing, via the SIEM configuration, a suspect account from the tenant network.

Clause 12. The method according to any of clauses 9-11, further comprising pulling, via the target tenant, the tenant-specific SIEM configuration from the tenant-specific repository.

Clause 13. The method according to any of clauses 9-12, further comprising pushing, via the SIEM provider server, the tenant-specific SIEM configuration from the tenant-specific repository to the target tenant.

Clause 14. The method according to any of clauses 9-13, further comprising autonomously generating, via a scripting engine, a script configured to autonomously initiate a periodic query for content changes in the tenant-specific repository.

Clause 15. The method according to any of clauses 9-14, wherein the script is a repository commit command.

Clause 16. The method according to any of clauses 9-15, further comprising: receiving, via the SIEM provider server, a response to at least one query initiated by the scripting engine; determining, via the SIEM provider server, that the SIEM configuration comprises a tenant-initiated change based on the received response; and autonomously determining, via the SIEM provider server, to reject tenant-initiated changes to an existing, tenant-specific SIEM configuration.

Clause 17. A system for enhancing network security, the system comprising: a centralized content repository; a plurality of tenant-specific repositories; a plurality of tenants configured to host a plurality of clients; and a Security Information, and Event Management (SIEM) provider server communicably coupled to the plurality of tenants, wherein the SIEM provider server comprises a processor, and a memory, wherein the memory is configured to store a managed security service provider ("MSSP") management platform that, when executed by the processor, causes the processor to: provide a graphical user interface displaying a plurality of widgets, wherein each widget of the plurality of widgets is associated with a tenant of the plurality of tenants; receive, via the graphical user interface, a user input associated with a target tenant of the plurality of tenants; autonomously retrieve an SIEM artifact associated with the target tenant from the content repository; generate a tenant-specific SIEM configuration for the target tenant comprising the SIEM artifact, wherein the tenant-specific SIEM configuration is configured to continuously monitor the target tenant for security events and, upon detecting a security event, autonomously take an action to secure the target tenant; and deploy the tenant-specific SIEM configuration to a tenant-specific repository of the plurality of tenant-specific repositories associated with the target tenant.

Clause 18. The system according to clause 17, wherein the tenant-specific SIEM configuration is one of a plurality of tenant-specific SIEM configurations generated via the SIEM provider server for each tenant of the plurality of tenants, and wherein the SIEM provider server is configured to simultaneously deploy and update the plurality of tenant-specific SIEM configurations on behalf of each tenant of the plurality of tenants.

Clause 19. The system according to either of clauses 17 or 18, wherein the action to secure the target tenant comprises autonomously removing a suspect account from a network of the target tenant.

Clause 20. The system according to either of clauses 17-19, wherein the memory of the SIEM provider server is further configured to store a scripting engine that, when executed by the processor, causes the processor to generate a script configured to autonomously initiate a periodic query for content changes in the plurality of tenant-specific repositories.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference, and the disclosure expressly set forth in the present application controls.

Various exemplary, and illustrative aspects have been described. The aspects described herein are understood as providing illustrative features of varying detail of various aspects of the present disclosure; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the present disclosure. Accordingly, it will be recognized by persons having ordinary skill in the art that various substitutions, modifications, or combinations of any of the exemplary aspects may be made without departing from the scope of the claimed subject matter. In addition, persons skilled in the art will recognize, or be able to ascertain using no more than routine experimentation, many equivalents to the various aspects of the present disclosure upon review of this specification. Thus, the present disclosure is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one", and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one", and indefinite articles such as "a"

or "an" (e.g., "a", and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A, and B together, A, and C together, B, and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A, and B together, A, and C together, B, and C together, and/or A, B, and C together, etc.). It will be further understood by those within the art that typically a disjunctive word, and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A, and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification,", and the like means that a particular feature, structure, or characteristic described in connection with the aspect is included in at least one aspect. Thus, appearances of the phrases "in one aspect," "in an aspect," "in an exemplification,", and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example, and without limitation, top, bottom, left, right, lower, upper, front, back, and variations thereof, shall relate to the orientation of the elements shown in the accompanying drawing, and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced, and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits, and by applying ordinary rounding techniques.

Any numerical range recited herein includes all sub-ranges subsumed within the recited range. For example, a range of "1 to 100" includes all sub-ranges between (and including) the recited minimum value of 1, and the recited maximum value of 100, that is, having a minimum value equal to or greater than 1, and a maximum value equal to or less than 100. Also, all ranges recited herein are inclusive of the end points of the recited ranges. For example, a range of "1 to 100" includes the end points 1, and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification, and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material, and the existing disclosure material.

The terms "comprise" (and any form of comprise, such as "comprises", and "comprising"), "have" (and any form of have, such as "has", and "having"), "include" (and any form of include, such as "includes", and "including"), and "contain" (and any form of contain, such as "contains", and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains"

one or more features possesses those one or more features, but is not limited to possessing only those one or more features.

The foregoing detailed description has set forth various forms of the devices, and/or processes via the use of block diagrams, flowcharts, and/or examples. Insofar as such block diagrams, flowcharts, and/or examples contain one or more functions, and/or operations, it will be understood by those within the art that each function, and/or operation within such block diagrams, flowcharts, and/or examples can be implemented, individually, and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry, and/or writing the code for the software, and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor comprising one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein, "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes, and/or devices described herein, or a microprocessor configured by a computer program which at least partially carries out processes, and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware, and/or circuitry configured to perform any of the aforementioned operations. Software may be embodied as a software package, code, instructions, instruction sets, and/or data recorded on non-transitory computer readable storage medium. Firmware may be embodied as code, instructions or instruction sets, and/or data that are hard-coded (e.g., nonvolatile) in memory devices.

As used in any aspect herein, the terms "component," "system," "module", and the like can refer to a computer-related entity, either hardware, a combination of hardware, and software, software, or software in execution.

As used in any aspect herein, an "algorithm" refers to a self-consistent sequence of steps leading to a desired result, where a "step" refers to a manipulation of physical quantities, and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These, and similar terms may be associated with the appropriate physical quantities, and are merely convenient labels applied to these quantities, and/or states.

What is claimed is:

1. A Security Information and Event Management ("SIEM") provider server configured to enhance network security on behalf of a plurality of tenant networks, wherein the SIEM provider server comprises a processor and a memory, wherein the memory is configured to store machine executable instructions to implement a managed security service provider ("MSSP") management platform that, when executed by the processor, causes the processor to:

provide a graphical user interface displaying a plurality of widgets associated with the plurality of tenant networks, wherein at least one widget of the plurality of widgets is associated with a first tenant network of the plurality of tenant networks;

autonomously retrieve SIEM artifacts from a content repository coupled to the SIEM provider server, wherein the SIEM artifacts comprise scripts defining an alert rule, a playbook, or a workbook, a data connector, or a parser, or a combination thereof;

autonomously transform the SIEM artifacts to a format deployable with the first tenant network;

generate a tenant-specific SIEM configuration for the first tenant network based on the transformed SIEM artifacts, wherein the tenant-specific SIEM configuration comprises a collection of the transformed SIEM artifacts and is configured to continuously monitor the first tenant network for security events and, upon detecting a security event, autonomously take an action to secure the first tenant network; and deploy the tenant-specific SIEM configuration to a tenant-specific repository associated with the first tenant network for configuration on the first tenant network.

2. The SIEM provider server of claim 1, wherein the first tenant-specific SIEM configuration for the first tenant network is one of a plurality of tenant-specific SIEM configurations generated by the SIEM provider server, and wherein the SIEM provider server is configured to simultaneously deploy and update each tenant-specific SIEM configuration of the plurality of tenant-specific SIEM configurations on behalf of each tenant network of the plurality of tenant networks.

3. The SIEM provider server of claim 1, wherein the action comprises autonomously removing a suspect account from the first tenant network.

4. The SIEM provider server of claim 1, wherein the first tenant network is configured to pull the tenant-specific SIEM configuration from the tenant-specific repository.

5. The SIEM provider server of claim 1, wherein the MSSP management platform is configured to push the tenant-specific SIEM configuration from the tenant-specific repository to the first tenant network.

6. The SIEM provider server of claim 1, further comprising a scripting engine configured to generate a script configured to autonomously initiate a periodic query for content changes in the tenant-specific repository.

7. The SIEM provider server of claim 6, wherein the script is a repository commit command.

8. The SIEM provider server of claim 6, wherein, when executed by the processor, the MSSP management platform further causes the processor to:

receive a response to at least one query initiated by the scripting engine;

determine that the deployed tenant-specific SIEM configuration comprises a tenant-initiated change based on the received response; and autonomously determine to reject tenant-initiated changes to the deployed tenant-specific SIEM configuration.

9. A method of enhancing network security on behalf of a plurality of tenant networks via a Security Information and Event Management ("SIEM") provider server, the method comprising:

displaying, via a graphical user interface, a plurality of widgets associated with the plurality of tenant networks, wherein at least one widget of the plurality of widgets is associated with a first tenant network of the plurality of tenant networks;

autonomously retrieving, via a scripting engine hosted on the SIEM provider server, SIEM artifacts from a content repository coupled to the SIEM provider server, wherein the SIEM artifacts comprise scripts defining an alert rule, a playbook, or a workbook, a data connector, or a parser, or a combination thereof;

autonomously transforming the SIEM artifacts to a format deployable with the first tenant network;

generating, via the SIEM provider server, a tenant-specific SIEM configuration for the first tenant network based on the transformed SIEM artifacts, wherein the tenant-specific SIEM configuration comprises a collection of the transformed SIEM artifacts;

deploying, via the SIEM provider server, the tenant-specific SIEM configuration to the first tenant network via a tenant-specific repository coupled to the SIEM provider server;

continuously monitoring, via the SIEM configuration, the first tenant network for security events; and autonomously taking an action, via the SIEM configuration, to secure the first tenant network upon detecting a security event.

10. The method of claim 9, wherein the tenant-specific SIEM configuration is one of a plurality of tenant-specific SIEM configurations generated by the SIEM provider server, and wherein the method further comprises:

simultaneously deploying, via the SIEM provider server, each tenant-specific SIEM configuration of the plurality of tenant-specific SIEM configurations to each tenant network of the plurality of tenant networks; and simultaneously updating, via the SIEM provider server, each tenant-specific SIEM configuration of the plurality of tenant-specific SIEM configurations on behalf of each tenant network of the plurality of tenant networks.

11. The method of claim 9, wherein autonomously taking the action comprises autonomously removing, via the tenant-specific SIEM configuration, a suspect account from the first tenant network.

12. The method of claim 9, further comprising pulling, via the first tenant network, the tenant-specific SIEM configuration from the tenant-specific repository.

13. The method of claim 9, further comprising pushing, via the SIEM provider server, the tenant-specific SIEM configuration from the tenant-specific repository to the first tenant network.

14. The method of claim 9, further comprising autonomously generating, via a scripting engine, a script configured to autonomously initiate a periodic query for content changes in the tenant-specific repository.

15. The method of claim 14, further comprising:

receiving, via the SIEM provider server, a response to at least one query initiated by the scripting engine;

determining, via the SIEM provider server, that the deployed tenant-specific SIEM configuration comprises a tenant-initiated change based on the received response; and autonomously determining, via the SIEM provider server, to reject tenant-initiated changes to the deployed tenant-specific SIEM configuration.

16. The method of claim 9, wherein the script is a repository commit command.

17. A system for enhancing network security, the system comprising:

a centralized content repository;

a plurality of tenant-specific repositories;

a plurality of tenants configured to host a plurality of clients; and a Security Information, and Event Management (SIEM) provider server coupled to the plurality of tenants, wherein the SIEM provider server comprises a processor, and a memory, wherein the memory is configured to store a managed security service provider ("MSSP") management platform that, when executed by the processor, causes the processor to:

provide a graphical user interface displaying a plurality of widgets, wherein each widget of the plurality of widgets is associated with at least one of the plurality of tenants;

receive, via the graphical user interface, a user input associated with a target tenant of the plurality of tenants;

autonomously retrieve SIEM artifacts from the content repository, wherein the SIEM artifacts comprise scripts defining an alert rule, a playbook, or a workbook, a data connector, or a parser, or a combination thereof;

autonomously transform the SIEM artifacts to a format deployable with target tenant network;

generate a tenant-specific SIEM configuration for the target tenant based on the transformed SIEM artifacts wherein the tenant-specific SIEM configuration comprises a collection of the transformed SIEM artifacts and is configured to continuously monitor the target tenant for security events and, upon detecting a security event, autonomously take an action to secure the target tenant; and deploy the tenant-specific SIEM configuration to a tenant-specific repository of the plurality of tenant-specific repositories associated with the target tenant.

18. The system of claim 17, wherein the tenant-specific SIEM configuration is one of a plurality of tenant-specific SIEM configurations generated via the SIEM provider server for each tenant of the plurality of tenants, and wherein the SIEM provider server is configured to simultaneously deploy and update the plurality of tenant-specific SIEM configurations on behalf of each tenant of the plurality of tenants.

19. The system claim 17, wherein the action to secure the target tenant comprises autonomously removing a suspect account from a network of the target tenant.

20. The system of claim 17, wherein the memory of the SIEM provider server is further configured to store a scripting engine that, when executed by the processor, causes the processor to generate a script configured to autonomously initiate a periodic query for content changes in the plurality of tenant-specific repositories.

* * * * *